United States Patent
Eisele et al.

(10) Patent No.: US 10,459,185 B2
(45) Date of Patent: Oct. 29, 2019

(54) FIBER OPTIC CABLE BUFFER TUBE MID-SPAN ACCESS TOOL

(71) Applicant: Ripley Tools, LLC, Cleveland, OH (US)

(72) Inventors: Will Eisele, New Britain, CT (US); Brian Bourgoin, Cromwell, CT (US)

(73) Assignee: RIPLEY TOOLS, LLC, Cleveland, OH (US)

( * ) Notice: Subject to any disclaimer, the term of this patent is extended or adjusted under 35 U.S.C. 154(b) by 0 days.

(21) Appl. No.: 15/957,422

(22) Filed: Apr. 19, 2018

(65) Prior Publication Data

US 2018/0306999 A1    Oct. 25, 2018

Related U.S. Application Data

(60) Provisional application No. 62/489,720, filed on Apr. 25, 2017.

(51) Int. Cl.

| | |
|---|---|
| *B26D 7/26* | (2006.01) |
| *G02B 6/44* | (2006.01) |
| *B26D 3/28* | (2006.01) |
| *H02G 1/12* | (2006.01) |
| *H02G 1/04* | (2006.01) |

(52) U.S. Cl.
CPC ............. *G02B 6/4497* (2013.01); *B26D 3/28* (2013.01); *B26D 7/2628* (2013.01); *H02G 1/1229* (2013.01); *H02G 1/04* (2013.01)

(58) Field of Classification Search
CPC .......... H02G 1/1229; H02G 1/04; B26D 3/28; B26D 7/2628
See application file for complete search history.

(56) References Cited

U.S. PATENT DOCUMENTS 2,819,520 A * 1/1958 Eyles ................... H02G 1/1217
30/90.8
3,108,373 A * 10/1963 Ruskin ................. H02G 1/1297
144/239

(Continued)

FOREIGN PATENT DOCUMENTS

FR        2736475 A1    1/1997

*Primary Examiner* — Sean M Michalski
(74) *Attorney, Agent, or Firm* — DeLio Peterson & Curcio LLC; Thomas E. Ciesco

(57) ABSTRACT

A tool for removing insulation in mid-span of a cable carrying a signal-transmitting conduit comprising a lower body section and an upper body section movable toward and away from the lower body section. The tool includes a curved mandrel disposed on the lower body section, the curved mandrel having a central peak portion and adjacent portions curving downward away from the peak portion, to present a mid-span portion of the cable insulation on a side away from the mandrel peak portion. The tool includes a blade disposed on the upper body section, the blade movable toward and away from the curved mandrel. The cable is securable in the curved mandrel in a curved position, allowing the blade to shave the cable insulation allowing access to the signal-transmitting conduit. The tool may include an adjustment barrel having a plurality of height adjustment surfaces disposed at a different distance from the barrel axis, each height adjustment surface positioning the blade a different distance from the mandrel.

20 Claims, 12 Drawing Sheets

(56) References Cited

U.S. PATENT DOCUMENTS

| | | | |
|---|---|---|---|
| 3,114,277 A * | 12/1963 | Clendenin | H02G 1/1214 30/113 |
| 3,196,721 A * | 7/1965 | Chester | H02G 1/1248 83/421 |
| 3,572,189 A * | 3/1971 | Matthews | H02G 1/1226 30/90.1 |
| 4,104,791 A | 8/1978 | Sunahara | |
| 4,463,494 A * | 8/1984 | Bianco, Jr. | A44C 17/043 30/90.4 |
| 4,489,490 A | 12/1984 | Michaels | |
| 4,945,788 A | 8/1990 | Matthews | |
| 4,955,137 A | 9/1990 | Matthews | |
| 5,093,992 A * | 3/1992 | Temple, Jr. | G02B 6/4497 30/90.4 |
| 5,577,150 A * | 11/1996 | Holder | G02B 6/4475 30/90.4 |
| 5,771,586 A * | 6/1998 | Lotarski | B26D 3/065 30/290 |
| 5,995,697 A * | 11/1999 | Byron | G02B 6/02104 385/123 |
| 6,581,291 B1 * | 6/2003 | Tarpill | G02B 6/25 30/90.1 |
| 7,891,097 B2 * | 2/2011 | Hartranft | H02G 1/1297 30/90.3 |
| 9,099,853 B2 * | 8/2015 | Jones | H02G 1/1217 |
| 2009/0031864 A1 * | 2/2009 | Fritsche | G02B 6/245 81/9.51 |
| 2009/0041414 A1 * | 2/2009 | Lavenne | G02B 6/4495 385/109 |
| 2010/0000372 A1 | 1/2010 | Daggett et al. | |
| 2010/0319199 A1 * | 12/2010 | Mullaney | B26B 9/00 30/91.1 |
| 2015/0082639 A1 * | 3/2015 | Tews | H02G 1/1224 30/90.8 |
| 2017/0304903 A1 * | 10/2017 | Smith | B08B 1/005 |
| 2018/0069384 A1 * | 3/2018 | Cruz | H02G 1/1224 |
| 2018/0095222 A1 * | 4/2018 | Scirbona | G02B 6/4497 |
| 2018/0248344 A1 * | 8/2018 | Zagula | H02G 1/1226 |

* cited by examiner

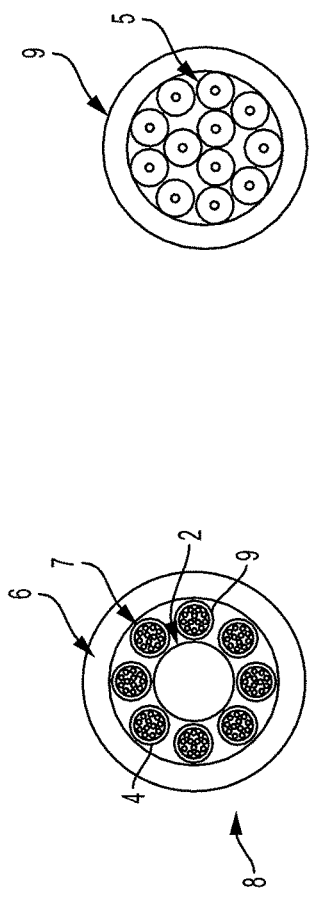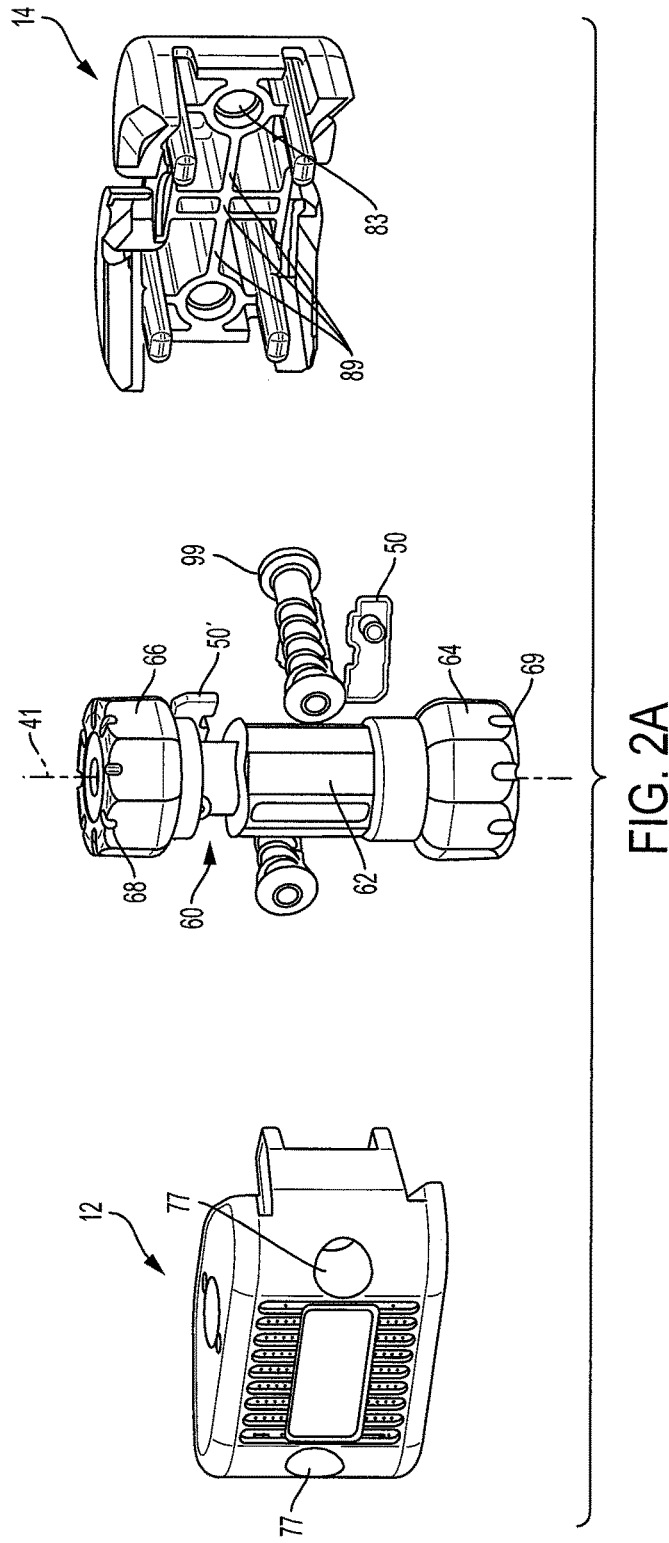

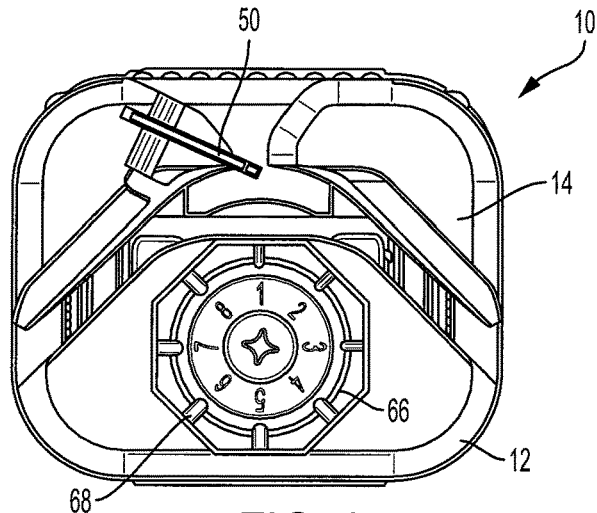

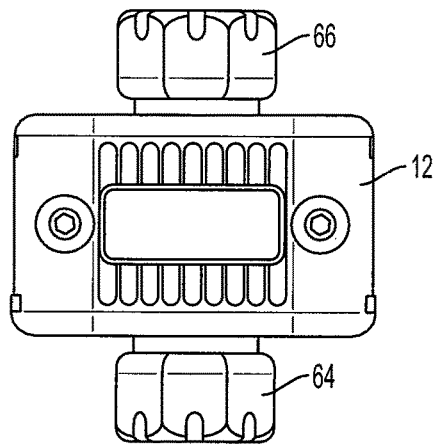
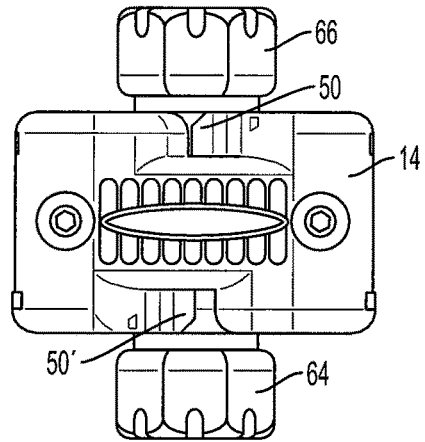
FIG. 8    FIG. 9
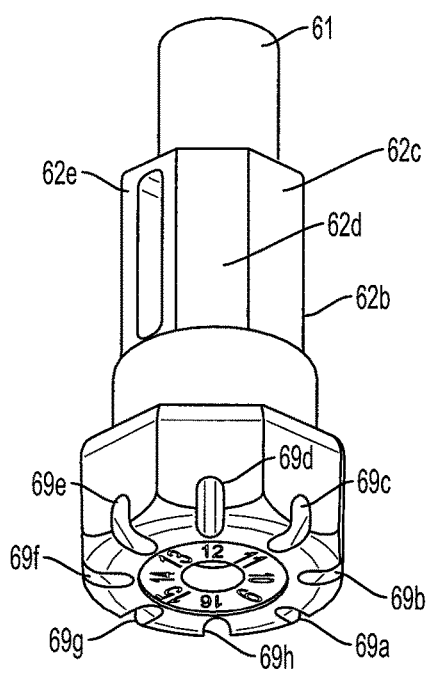
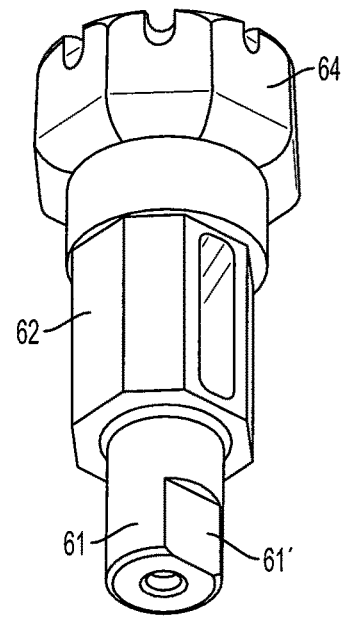
FIG. 10   FIG. 11

FIBER OPTIC CABLE BUFFER TUBE MID-SPAN ACCESS TOOL

BACKGROUND OF THE INVENTION

1. Field of the Invention

The present invention is directed to a tool for removing insulation in mid-span of a cable carrying a plurality of optical fibers or other signal-transmitting conduits.

2. Description of Related Art

Fiber optic cables are becoming more popular because the distance a signal can travel within a single fiber is far greater than in traditional copper cables. Installing these cables is time consuming because cable preparation is vital to signal strength. The fiber optic cables are very fragile, and any damage could dramatically reduce the performance of the cable. As with any cable network, the need to perform mid-span access is necessary. Mid-span cable preparation is more difficult because you cannot simply slip the cable construction off the end of the cable. Midspan access is common since service loops are used for long cable runs to allow for future expansion and configuration.

Typical fiber optic cable 8 construction such as the one shown in FIG. 1A consists of an outer jacket 6 with multiple groups of optical fiber 4. The individual optical fiber strands 4 are usually grouped within loose buffer cables or tubes 7 to help with cable organization and protection. Loose buffer tubes 7 are used in the cable construction and each has a surrounding layer of dielectric insulation 9 surrounding the fiber strands 4 for protection as well as grouping of subsets of fiber strands. Typically, 12 fibers strands 4 are bundled into a buffer tube 7. Support or strengthening cable 2 may be disposed between the tubes 7 to prevent the fiber optics from damage due to tension or compression. The loose buffer tube 7 shown in FIG. 1B includes outer jacket or insulation layer 9 with single fiber buffer tubes 5 grouped within the insulation layer 9.

One of the final steps for accessing mid-spanning fiber optics is removing a portion of insulation off the buffer tube around the fiber optic cables to expose the individual signal-carrying fiber strands. Different cable manufacturers use different diameter buffer tubes, causing an installer to purchase and use a different tool for each tube size. Loose buffer tubes are typically 0.004-0.010" thick depending on tube diameter and manufacturer. Improper tool sizing can cause fiber damage or cause the tool to not strip the tube from the fiber. These buffer tube sizes range from 1.0 mm to 3.0 mm and a certain tool can only be used over a small range (0.1 mm-0.2 mm) because of the precision involved.

Current tools are highly specialized and sized specifically for the buffer tube. They have a split housing design with scoring blades on each side that penetrate the wall of the buffer tube with a side hinge to allow the tool to be placed over the tube section. These tools are specifically sized with blade depths and inside diameter. Loading a smaller or larger tube could cause damage to the fibers within the tube. Some tools combine multiple channels into one tool. This saves the end user from using multiple tools for different cables. However, this tool also causes loading errors from using the wrong channel and fiber damage from clamping the tool when the buffer tube has spanned multiple channels.

Other tool designs use shaving as the means of exposing a window in the buffer tube. The resulting buffer tube window exposes the individual fiber strands, but it is critical that the act of opening the buffer tube window does not nick or contact the individual fiber strands. However, the current platforms do not have the accuracy to shave the buffer tube for smaller sized cables (~less than 2 mm). Other, more expensive tools use shaving to remove the buffer tube, however they are very complicated. The precision is a result of accurately machined inserts that are used for each individual buffer tube size. The tool body itself is very expensive and for each buffer tube size a precision insert must be purchased. This is not an economical or versatile solution:

SUMMARY OF THE INVENTION

It would be useful to have an improved means to remove fiber optic strands from buffer tube.

Bearing in mind the problems and deficiencies of the prior art, it is therefore an object of the present invention to provide a tool for removing insulation in mid-span of a cable carrying a plurality of signal-transmitting conduits which utilizes an improved fiber alignment channel, fine adjustment mechanism, and range multiplying feature to maximize precision and range of the tool.

It is another object of the present invention to provide a tool for removing insulation in mid-span of a cable carrying a plurality of signal-transmitting conduits which allows for all buffer tubes to be accurately shaved all with one tool.

It is still another object of the present invention to provide a tool having a fine adjustment barrel for accurate setting adjustment.

It is another object of the present invention to provide a tool having a cable alignment arc which orients fibers inside buffer tube and creates accurate and repeatable presentation of fiber to blade and preload area.

It is a further object of the present invention to provide an access tool which is easily manufactured from a polymer.

It is yet another object of the present invention to provide a range multiplying feature to effectively double the range of the tool.

It is still a further object of the present invention to provide an access tool having a blade which is easily replaced and is secured by blade supports which limit the flex of the blade.

It is another object of the present invention to provide a tool including cable sizing gaps for field evaluation of tool settings.

Still other objects and advantages of the invention will in part be obvious and will in part be apparent from the specification.

The above and other objects, which will be apparent to those skilled in the art, are achieved in the present invention which is directed to a tool for removing insulation in mid-span of a cable carrying a signal-transmitting conduit comprising a lower body section and an upper body section movable toward and away from the lower body section. The tool includes a curved mandrel disposed on the lower body section, the curved mandrel having a central peak portion and adjacent portions curving downward away from the peak portion, to present a mid-span portion of the cable insulation on a side away from the mandrel peak portion. The tool includes a blade disposed on the upper body section, the blade movable toward and away from the curved mandrel. The cable is securable in the curved mandrel in a curved position, allowing the blade to shave the cable insulation allowing access to the signal-transmitting conduit. The tool may include an adjustment barrel having a length and a central axis extending the length of the barrel and including a plurality of height adjustment surfaces each adjustment surface disposed at a different distance from the barrel axis wherein each height adjustment surface positions the blade a different distance from the mandrel. The tool may include an adjustment knob for controlling the distance between the upper body section and the lower body section when the tool is in a closed position. The adjustment knob may include a knob face and a plurality of sizing notches disposed in the knob face, each sizing notch corresponding with the diameter of different diameter cables. The tool may include a cable channel disposed along the curved surface of the mandrel, the cable slidable along the cable channel when the cable is disposed in the cable channel and including a cable guide disposed on the upper body portion wherein the cable guide secures the cable in the cable channel when the upper body portion is in a position toward the lower body portion wherein the blade extends through the cable guide to contact the portion of the cable insulation at the mandrel peak. The mandrel may be a first mandrel disposed on one side of the lower body portion and the tool may include a second mandrel on the opposite side of the lower body portion than the first mandrel. The cable guide may be a first cable guide disposed on the upper body portion adjacent the first mandrel and the tool may include a second cable guide adjacent the second mandrel wherein the first cable guide secures a first cable in the first cable channel when the upper body portion is in a position toward the lower body portion or the second cable guide secures a second cable having a different diameter'than the first cable diameter when the upper body portion is in a position toward the lower body portion. The blade may be a first blade disposed on the upper body portion adjacent the first mandrel and the tool may include a second blade adjacent the second mandrel. The tool may include an adjustment barrel having a length and a central axis extending the length of the barrel and may include a plurality of height adjustment surfaces each adjustment surface disposed at a different distance from the barrel axis. The tool may include a first adjustment knob on one end of the barrel corresponding with one range of cable diameters and a second adjustment knob on the opposite end of the barrel corresponding with a second range of cable diameters. Each of the adjustment knobs may include a knob face and a plurality of sizing notches disposed in the knob face, each sizing notch corresponding with the diameter of different diameter cables. The lower body portion may include at least one alignment member and the upper body portion may include at least one alignment opening slidingly engageable with the at least one alignment member wherein the upper body portion maintains a position parallel with the lower body portion when the upper body portion is moved toward or away from the lower body section. The tool may include a stop fastener disposed on the at least one alignment member wherein the upper body portion is limited in the distance the upper body portion is movable in a direction away from the lower body portion. The tool may include a compression spring disposed on the at least one alignment member wherein the upper body portion is biased away from the lower body portion. The tool may include a loading member contacting the cable insulation on the side of the cable away from the mandrel, in a location adjacent to and prior to the cable insulation being shaved by the blade. The tool may include blade supports contacting both sides of the blade over a substantial portion of the surface thereof. The tool may include a loading member contacting the cable insulation on the side of the cable away from the mandrel, in a location adjacent to and prior to the cable insulation being shaved by the blade, and blade supports contacting both sides of the blade over a substantial portion of the surface thereof, the tool housing being adjustably secured to the curved mandrel to adjust the distance therebetween. The plane of the blade may be at an acute angle to the longitudinal axis of the cable at the mandrel central peak portion, and the blade may have a cutting edge oriented perpendicular to the cable longitudinal axis and cut a desired circumferential width of the insulation. The cable insulation on the side of the cable away from the mandrel peak portion may be in tension before being contacted by the blade. The barrel and control surfaces may be planar, and the different adjacent barrel surfaces around the barrel circumference set to increasingly greater or smaller distances from the central axis. The tool may include a knob for rotating the barrel, the knob having indicia thereon to indicate the selected one of the barrel surfaces presented toward the control surface.

Another aspect of the present invention is directed to a tool for cutting or removing insulation from a cable carrying a plurality of signal-transmitting conduits. The tool comprises a housing having a first housing portion for supporting the cable and a second housing portion for securing a blade to cut or remove insulation from the cable supported by the first housing portion, the first and second housing portions being moveable toward and away from each other to position the blade a desired distance from the cable supported by the first housing portion. The tool includes a barrel rotatable about a central axis and having a plurality of surfaces around its circumference, each of the barrel surfaces being located at a different distance from the central axis and a control surface for contacting one of the barrel surfaces. The control surface is disposed on one of the first or second housing portions and the barrel is rotatably secured to the other of the first or second housing portions to present a selected one of the barrel surfaces to the control surface. When the first and second housing portions are moved toward each other, the selected barrel surface contacts the control surface and establishes the closest distance between the housing portions and the distance of the blade from the cable supported by the first housing portion. When the distance between the first and second housing portions is established by contact between the selected one of the barrel surfaces and the control surface, the established distance is fixed and the cable is moved relative to the housing to use the blade to cut or remove the insulation from the cable.

Another aspect of the present invention is directed to a method for shaving insulation from a cable carrying at least one signal-transmitting conduits. The method includes providing a cable having cable insulation around a plurality of signal-transmitting conduits and providing the tool for removing insulation comprising a lower body section and an upper body section movable toward and away from the lower body section, a curved mandrel disposed on the lower body section, the curved mandrel having a central peak portion and adjacent portions curving downward away from the peak portion, to present a mid-span portion of the cable insulation on a side away from the mandrel peak portion and a blade disposed on the upper body section, the blade movable toward and away from the curved mandrel. The method includes ensuring the tool is in an open position and securing the cable in the curved mandrel in a curved position. The method includes moving the first and second housing portions toward each other, fixing the established distance between the housing portions and the distance of the blade from the cable supported by the first housing portion. The method includes moving the cable relative to the housing and using the blade to cut or remove the insulation from the cable. The method includes moving the first and second housing portions away from each other and removing the cable from the curved mandrel. The tool may include an adjustment barrel having a length and a central axis extending the length of the barrel and including a plurality of height adjustment surfaces each adjustment surface disposed at a different distance from the barrel axis wherein each height adjustment surface positions the blade a different distance from the mandrel and the method includes rotating the barrel to present a selected barrel surface toward the control surface, and the step of moving the first and second housing portions toward each other includes moving the first and second housing portions until the selected barrel surface contacts the control surface, fixing the established distance between the housing portions and the distance of the blade from the cable supported by the first housing portion.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings which describe and show a preferred embodiment of the present invention in various side, top, bottom and perspective views.

FIG. 1A is a cross sectional view of a fiber optic cable.

FIG. 1B is a cross sectional view of one of the buffer tubes shown in the fiber optic cable in FIG. 1A.

FIGS. 2A and 2B are perspective views of the mid-span access tool with the upper and lower body members exploded and the alignment posts positioned with respect to the adjustment barrel when the tool is in an open position.

FIG. 3 is a front elevational view of the mid-span access tool in an open position.

FIG. 4 is a rear elevational view of the mid-span access tool shown in FIG. 3.

FIG. 5 is a rear elevational view of the mid-span access tool in a closed position with a buffer tube inserted in the tool.

FIG. 8 is a bottom view of the mid-span access tool shown in FIG. 3.

FIG. 9 is a top plan view of the mid-span access tool shown in FIG. 3.

FIG. 10 is a top rear perspective view of the adjustment barrel.

FIG. 11 is a top front perspective view of the adjustment barrel shown in FIG. 10.

DESCRIPTION OF THE EMBODIMENT(S)

Figure 2B:
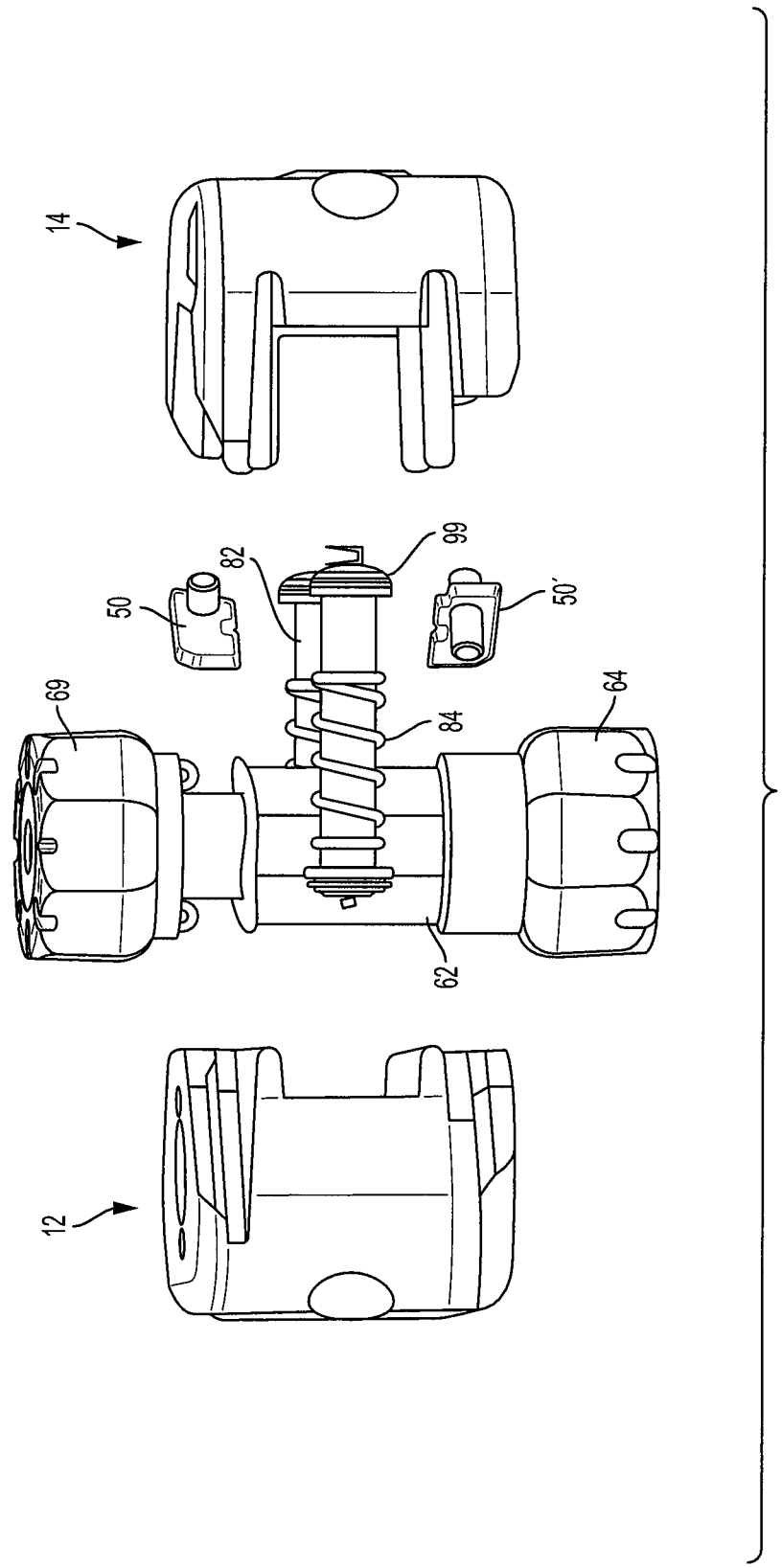
Figure 7:
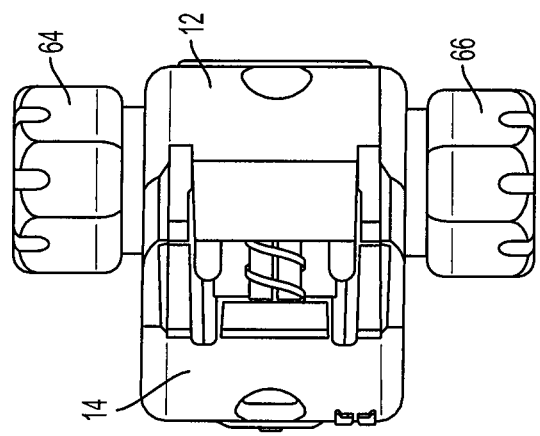
FIG. 7 is a left side elevational view of the mid-span access tool shown in FIG. 3.
Figure 6:
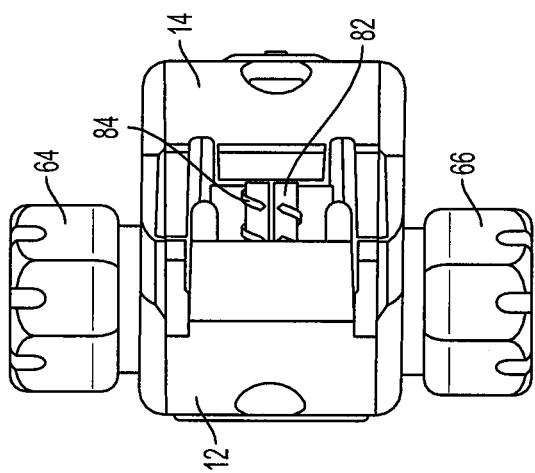
FIG. 6 is a right side elevational view of the mid-span access tool shown in FIG. 3.
Figure 12:
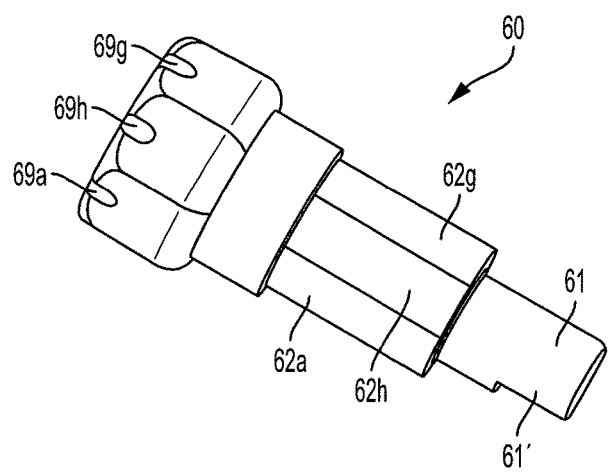
FIG. 12 is a top plan view of the adjustment barrel shown in FIG. 10.

In describing the embodiment(s) of the present invention, reference will be made herein to the drawings below and FIGS. 1-22 attached hereto in which like numerals refer to like features of the invention.

The present invention provides precise tool and method of use to shave an access window into a range of sizes of buffer tubes for signal-transmitting conduits, primarily fiber optic cables. The tool may also be used for shaving insulation from other cables or tubes carrying the signal-transmitting conduits such as electrical wires.

In a first embodiment of the shaving tool 10 shown in FIGS. 2-9 and 19 with individual components shown in FIGS. 10-18, the shaving or mid-span access tool includes lower body portion 12 is slidingly engageable with guide base member 14. Lower body portion 12 includes a small tube channel 30 for the insertion of a small buffer tube. Lower body portion 12 includes a large tube channel 34 on the opposite side of the lower body portion 12 from the small tube channel 30. Upper body member 14 includes a large tube guide 32 for securing the large buffer tube in large tube channel 30. Upper body member 14 includes a large tube guide 36 for securing the large buffer tube in large tube channel 34. Alignment cylinders 82 are disposed in cylinder openings 85 on lower body portion 12 and slidingly engage the alignment openings 83 on guide base member 14 whereby the lower body portion 12 and guide base member 14 may move toward and away from one another. The alignment cylinders 82 may be secured in the cylinder openings 85 with fasteners (not shown) through the outer openings 77 (shown in FIG. 2A). Compression springs 84 disposed around the alignment cylinders 82 urge the guide base member 14 away from the lower body portion 12 for biasing the tool 10 in an open position, allowing a buffer tube to be inserted into the small tube channel 30 or large tube channel 34. Alignment posts 88, 88' extend from the lower body portion 12 and upper body portion 14 and engage post openings 86 for added stability as the lower body portion 12 slides toward or away from guide base member 14. As seen clearly in FIG. 17, small channel flange 33 provides further cable support for small tube channel 30 and large channel flange 39 provides further cable support for large tube channel 34.

Figure 13:
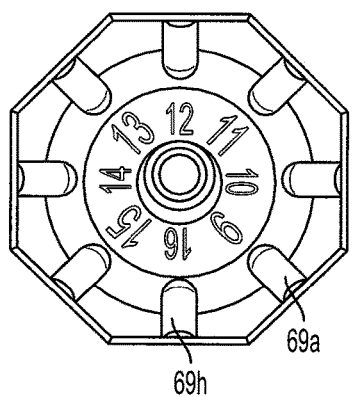
FIG. 13 is a rear elevational of the adjustment barrel shown in FIG. 10.
Figure 14:
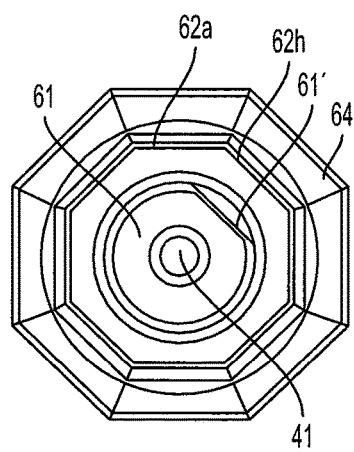
FIG. 14 is an elevational of the adjustment barrel shown in FIG. 10.
Figure 17:
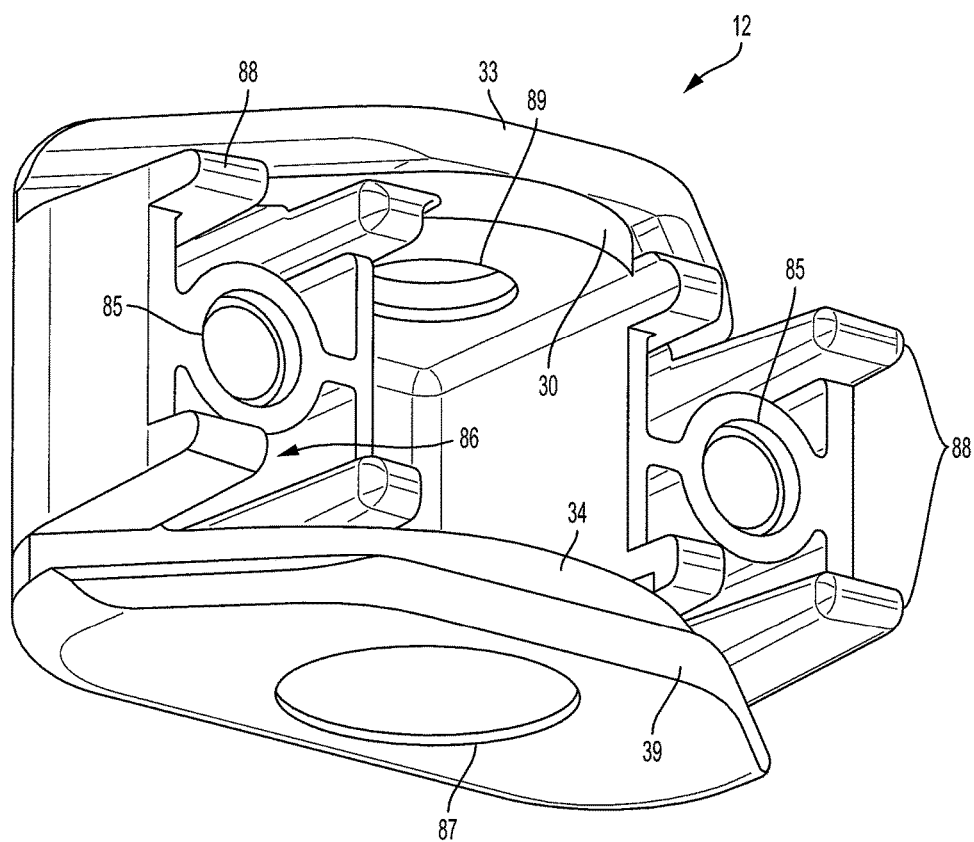
FIG. 17 is a perspective view of the lower body portion of the mid-span access tool according to the present invention.
Figure 18:
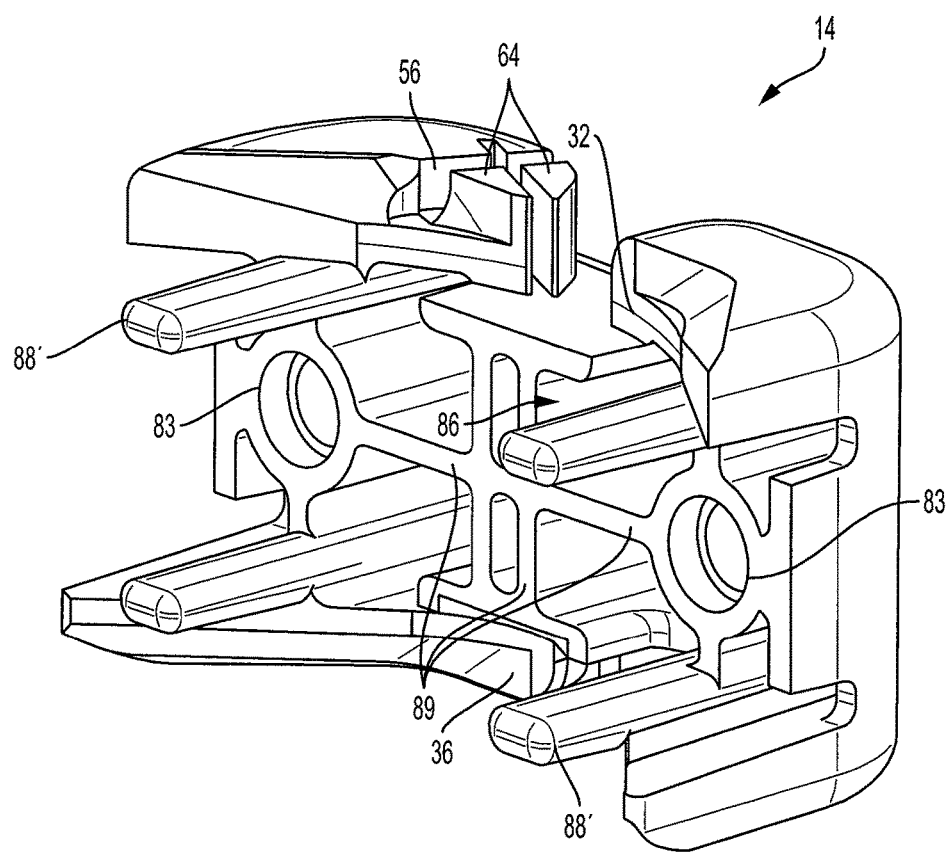
FIG. 18 is a perspective view of the upper body portion of the mid-span access tool according to the present invention.
Figure 19:
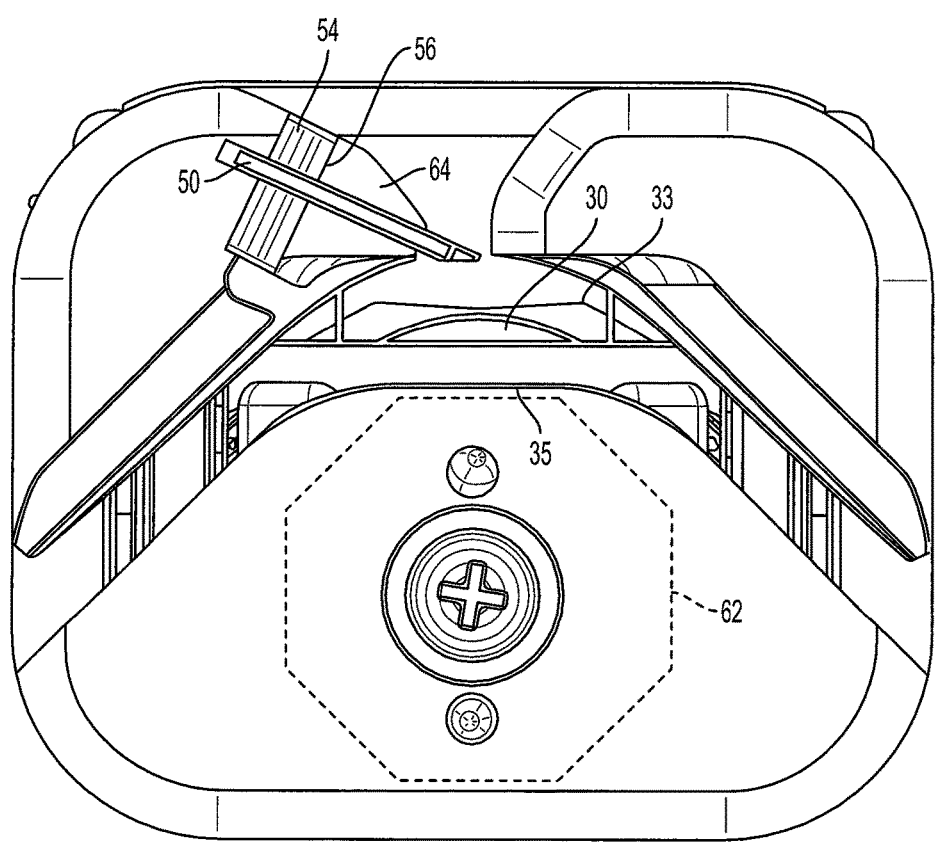
FIG. 19 is a front elevational view of the mid-span access tool in an open position and the adjustment barrel shown in phantom lines.

An adjustment barrel 60 shown in FIGS. 10-14 extends through lower body portion 12 and is rotatingly secured to the lower body portion 12 by a first barrel opening 87 and a second barrel opening 87. The adjustment barrel includes height adjustment surfaces 62*a-h*, each adjustment surface disposed at a different distance from the barrel axis 41. A control surface 89 on the guide base member 14 is movable toward the adjustment barrel 60 as the shaving tool 10 is moved to the shaving position. The control surface 89 contacts one of the barrel adjustment surfaces 62*a-h* which is positioned parallel with the control surface. When contact is made between the control surface 89 and the barrel adjustment surfaces 62*a-h* which is positioned parallel with the control surface 89, the shaving tool 10 is in the closed and shaving position. Rotation of the barrel 60 positions a different barrel adjustment surface 62*a-h* parallel to the control surface 89 so that in the closed position, the distance between the tube channel and tube guides are different in each of the adjustment barrel 60 positions. The tool 10 also has sizing gaps 68*a-h* on adjustment knob 66 and sizing gaps 69*a-h* on adjustment knob 64, each sizing gap of different widths that operate as gauges to allow the end user to determine which barrel position should be used. In the field, it is not practical that the end user will know what diameter they are working with so the sizing gauge will help establish the tool setting. Each sizing gap may be located adjacent a numerical indicium corresponding with the buffer tube diameter. FIG. 13 shows the consecutive sizing gaps 69*a-h* with the first and smallest sizing gap 69*a* adjacent to the last and largest sizing gap 69*h*. Similarly, FIG. 17 shows the corresponding barrel adjustment surface 62*a-h* with the first and smallest barrel adjustment surface 62*a* adjacent to the last and largest barrel adjustment surface 62*h*. The first adjustment surface 62*a* can also be seen further from the barrel axis 41 than the last adjustment surface 62*h*, the first adjustment surface 62*a* setting the access tool 10 at a position for shaving the smallest cable and the last adjustment surface 62*h*, when in the active position, setting the access tool 10 at a position for shaving the largest cable. When using the opposite side of the access tool 10, the access tool 10 shaves cables in the next smaller range since the distance.

Figure 15A:
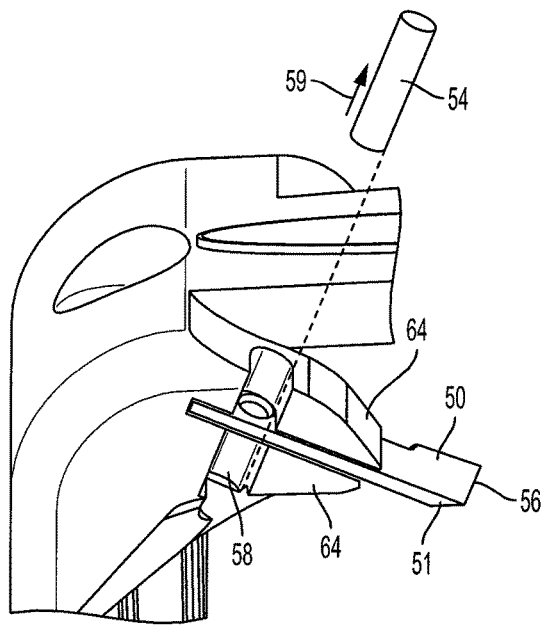
FIG. 15A is a front top perspective view of the blade portion of the mid-span access tool with the blade inserted and exploded view of the pin.
Figure 15B:
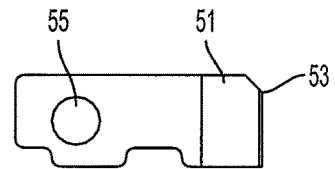
FIG. 15B is a top plan view of one embodiment of the blade.
Figure 15C:
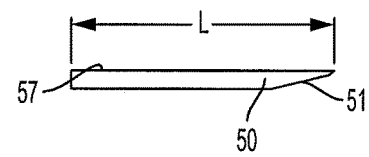
FIG. 15C is a side view of the blade shown in FIG. 15B.
Figure 15D:
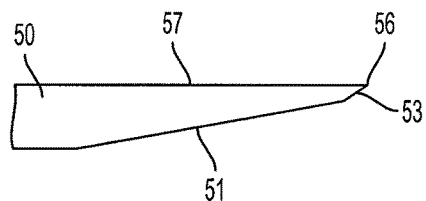
FIG. 15 is a close-up view of the microbevel on the blade shown in FIG. 15B.
Figure 16:
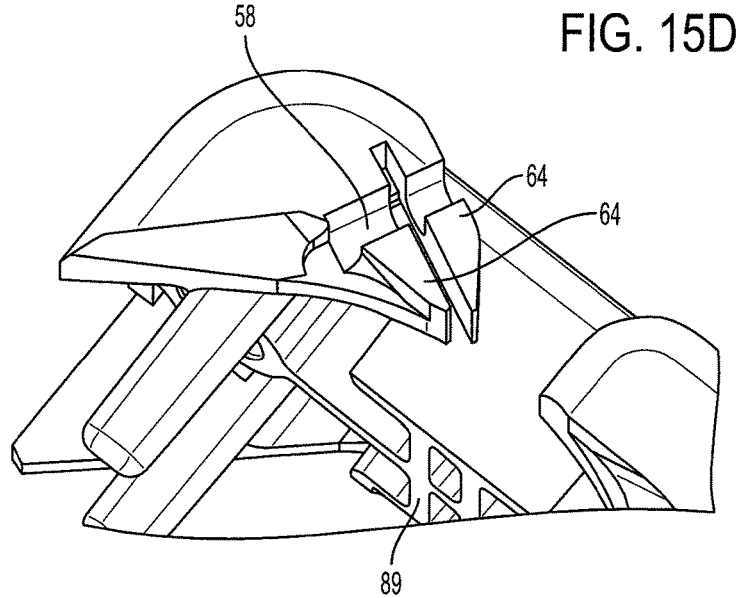
FIG. 16 is a front bottom perspective view of the blade portion of the mid-span access tool shown in FIG. 15 without the blade or pin.

FIG. 15A shows the portion of the upper body member 14 including a pair of blade supports 64 which supports blade 50 along a substantial portion of the blade length L. FIGS. 15B and 15C show top and side views and FIG. 15D shows a close up of the microbevel on the blade cutting edge. The upper body member 14 includes a securing pin groove 58 which engages a securing pin 54 extending through the blade pin opening 55 when the blade 50 is in the installed position. The blade 50 includes a cutting edge 51 and a microbevel 53 which is at a larger angle to the blade bottom surface 57 than the cutting edge 51. FIG. 16 shows a portion of the upper body member 14 with the securing pin 54 and blade 50 removed. The securing pin/blade configuration make it easy to remove the blade 50 by sliding the securing pin 54 from the blade pin opening 55 in the direction of arrow 59 and sliding the blade outwardly from between the blade supports 64. A blade groove 52 may be disposed on one side edge of the blade 50 to engage a corresponding protrusion (not shown) between the blade supports 62 to further support the blade 50 from sliding in the lengthwise direction.

The lower body portion 12 includes at least one alignment member 82 and the upper body portion includes at least one alignment opening 83 slidingly engageable with the at least one alignment member 82 wherein the upper body portion 14 maintains a position parallel with the lower body portion 12 when the upper body portion 14 is moved toward or away from the lower body section 12. A stop fastener. 99 is disposed on the at least one alignment member 82 wherein the upper body portion 14 is limited in the distance the upper body portion 14 is movable in a direction away from the lower body portion 12 and including a compression spring 84 disposed on the at least one alignment member 82 biasing the upper body portion 14 away from the lower body portion 12.

In a method of using mid-span access tool 10 shown in FIGS. 4 and 5, a user first determines the setting to use by placing the intact buffer tube 8 in one of the sizing gauges 68*a-h*, 69*a-h* and if the tube will not fit in the attempted gauge, trying another sizing gauge, repeating until a snug fit is obtained. The adjustment knob 66, 64 to which the buffer tube fits is then rotated until the indicia corresponding to the fitting gauge is positioned in the active position. The buffer tube 8 is then placed in the corresponding tube channel 30, 34 and the upper body member 14 is urged toward lower body member 12 until the contact surface 80 contacts the barrel surface 62 in the active surface position. The cable is then pulled in a direction 100 toward the blade 50 wherein a portion of the cable insulation is shaved from the buffer tube. Alternately, the access tool 10 is pulled in direction 102 with respect to the stationary cable 8, wherein a portion of the cable insulation is shaved from the buffer tube. The user then allows the upper body member to move away from the lower body member by releasing the pressure which maintains the tool in the closed position. The shaved cable is the removed from the access tool 10 and the internal cable members are accessible by the user.

Figure 20:
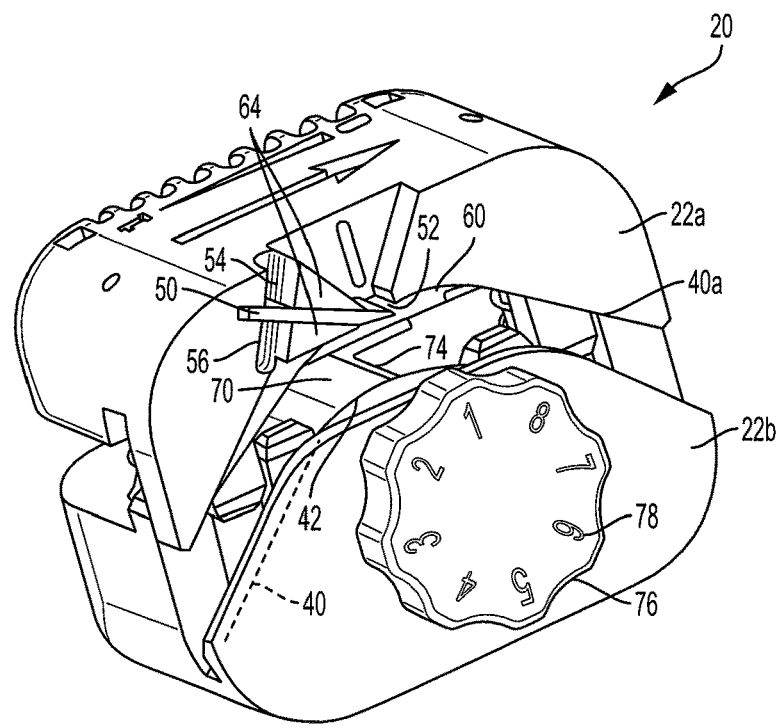
FIG. 20 is a top front left perspective view of a second embodiment of the mid-span access tool.
Figure 21:
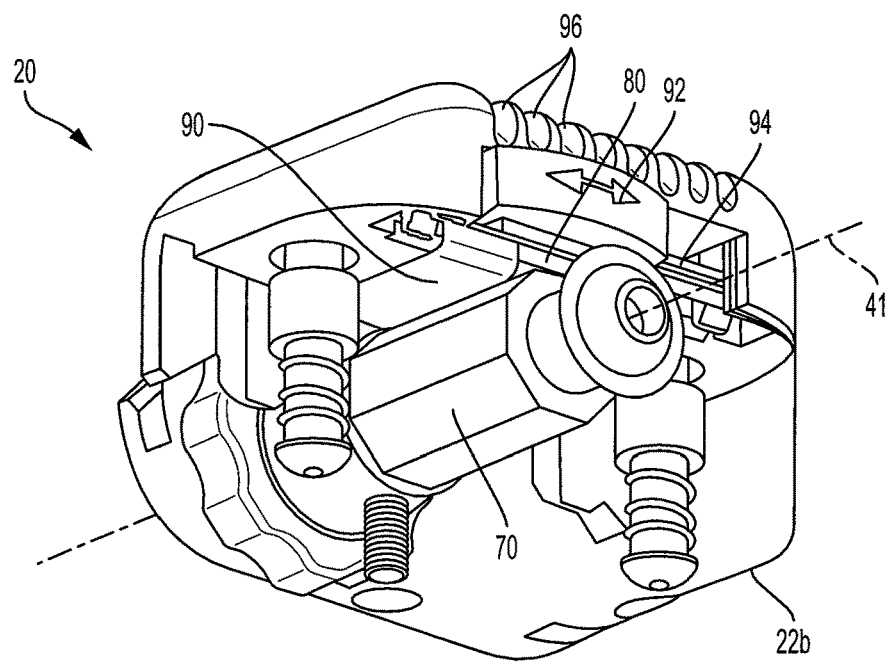
FIG. 21 is a bottom front left perspective view of the second embodiment of the mid-span access tool.
Figure 22:
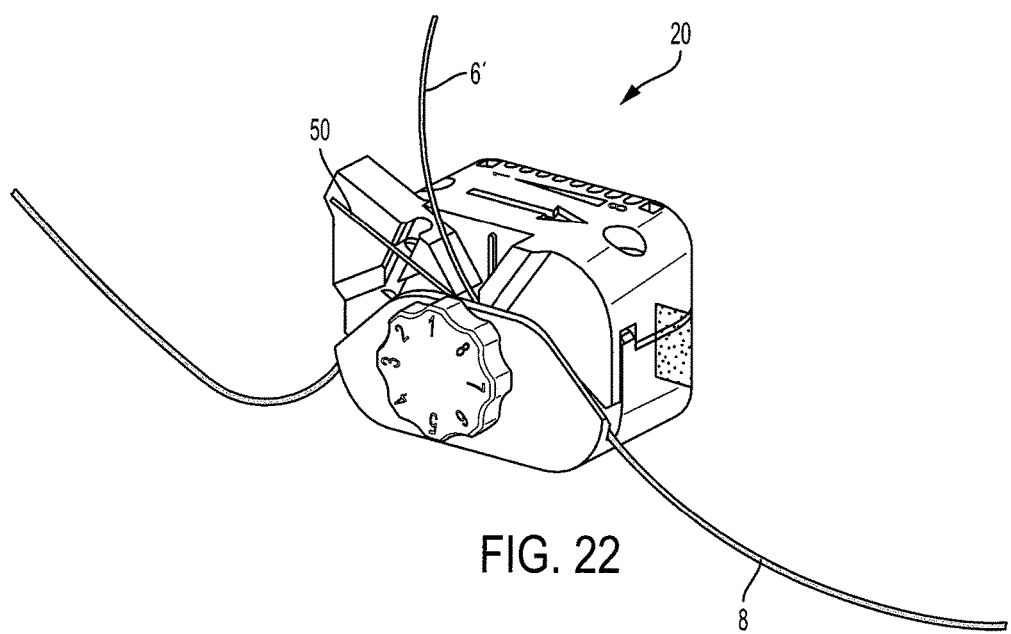
FIG. 22 is a perspective view of the mid-span access tool shown in FIG. 21, including a cable disposed therein.

In a second embodiment of the tool 20 shown in FIGS. 1C, 20 and 21 include the tool top half or first housing portion 22*a*, tool bottom half or second housing portion 22*b* shown in phantom lines, adjusting barrel 70, and range multiplying device 90. The tool 20 is cost effective and easily manufactured from injection molded plastic components. Buffer tube 8 containing multiple optical fiber stands 4 is loaded into the lower tool half 22*b* and the upper tool half 22*a* is closed onto the buffer tube 8. The end user pulls the tube 8 with respect to the tool 20. The pulling action passes the insulation layer 6 around the outer surface of buffer tube 8 across the cutting edge 52 of the blade 50. The tool sets the blade depth (as will be discussed further below) and the blade 50 shaves a window into the buffer tube 8 by removing a strip of the surrounding insulation layer 6' at a precise and controlled depth of cut. The shaving continues until the end user stops pulling the buffer tube 8 or opens the tool by raising top half 22*a*.

The tool may include a loading member 60 contacting the cable insulation 6 on the side of the cable 8 away from the mandrel 40, in a location adjacent to and prior to the cable insulation being shaved by the blade 50. The tool 20 may include blade supports 64 contacting both sides of the blade 50 over a substantial portion of the surface thereof. The tool 20 may include a tool housing 22*a* having fixedly attached a loading member 60 contacting the cable insulation 6 on the side of the cable 8 away from the mandrel 40, in a location adjacent to and prior to the cable insulation being shaved by the blade and blade supports 64 contacting both sides of the blade 50 over a substantial portion of the surface thereof, the tool housing 22*a* being adjustably secured to the curved mandrel 40 to adjust the distance therebetween. The plane of the blade 50 is at an acute angle to the longitudinal axis of the cable 8 at the mandrel central peak portion 42, and the blade 50 has a cutting edge 52 oriented perpendicular to the cable longitudinal axis and cuts a desired circumferential width of the insulation. The signal-transmitting conduits 4 are optical fibers or alternately may be metal wires. The insulation on the side of the cable away from the mandrel peak 42 portion is in tension before being contacted by the blade 50. The barrel 70 and control surfaces 74 are planar and the different adjacent barrel surfaces around the barrel circumference set to increasingly greater or smaller distances from the central axis 5.

Tool upper half 22a includes an upper control surface 80 and a variable control surface 90 moveable in and out of position between the selected barrel surface 74 and the base control surface 80. The variable control surface 80 may be a spacer. The tool 20 includes a knob 76 for rotating the barrel 70, the knob 76 having indicia 78 thereon to indicate the selected one of the barrel surfaces 74 presented toward the control surface 80.

Each tool half also includes cable channel 40. The channel includes geometric features that allow the tool 20 to shave or strip insulation on the large range of tube sizes. As the tool 20 is closed to its desired setting, the partial cable channel sections 40a and 40 in the upper and lower tool halves 22a, 22b, respectively, form a complete conduit for the cable to pass through.

Each setting of knob 76 moves the blade 50, preload area 60 and constraint surfaces 40a in the tool top half 22a as a group. This ensures consistent position of these components. These features move relative to the datum arc of the lower channel section or mandrel 40b and adjustment surfaces 74 of barrel 70 in the tool bottom half 22b.

The blade 50 may be positioned in the top tool half 22a and its support 64 is contained in the same detail as the upper constraint surface. The blade support wall 64 positions blade 50 at acute angle a with respect to the cable or tube 31 axis, is integrated into the tool upper half 22a and eliminates any blade movement or flex. The blade 50 is accurately secured by a tight fitting guide pin 54. This ensures stable, well supported blade position that is accurately located regardless of position of top half 22a with respect to bottom half 22b.

The buffer tube 8 is loaded onto the curved mandrel 40 in the tool bottom half 22b. Mandrel 40 has a central peak portion 42 and adjacent portions 44a, 44b curving smoothly downward away from the peak portion. The configuration of mandrel 40b presents for shaving a mid-span portion of the insulation 34 of cable tube 31 on the tube upper side, away from the mandrel peak portion 42. The tool top half 22a then slides down to close the gap and moves until the downward-facing control surface 80 on the tool upper half 40a bottoms out on one of the upward-facing surfaces 74 of adjustment barrel 70. The linear preload area 60 facing downward on upper half 40b contacts tube 8 on its upper surface near mandrel peak portion 42 and establishes a controlled sizing region for the loose buffer tube 8 as it passes to the blade 50 to be shaved. By forcing the buffer tube 8 through and along the datum arc of mandrel 40b, the tube is preloaded so that the insulation layer at the upper tube surface above mandrel peak portion 42 is in tension. This preloading acts to control the outer skin tension of the loose buffer tube 8. It also assists in urging and/or grouping the internal fiber strands 36 toward the lower portion of tube 8. Such preloading with the mandrel 40b datum arc, in conjunction with the linear preload area 60, creates a very repeatable and accurate interaction with the blade 50 across a range of buffer tube 8 sizes.

The blade 50 depth settings are achieved by closing the two halves of the tool. The gap between the tool halves are set by the adjusting barrel 70, which is housed in the tool bottom half 22b. Barrel 70 rotates about central axis 72 and has plurality of surfaces 74 around its circumference. Each barrel surface 74 is located at a different distance from axis 72, with the radial distance increasing from one adjacent surface to the next, until the barrel rotates 360° where the largest radius surface is adjacent to the smallest radius surface. The varying radial distances of the surfaces 74 allows different height settings for each partial turn of the barrel by knob 76. The design shown uses 8 specific adjustment surfaces per revolution, which are identified by indicia 78 on the knob, but the invention is not so limited, and may have more or less than 8 settings or surfaces. The individual settings may correspond to 1-2 buffer tube sizes—typically representing 0.1 mm incremental sizing. End users can use this fine adjustment to accurately set the tool for optimal shaving conditions. As the settings increase though barrel rotation, the upper and lower surfaces 40a, 40b of cable channel 40 are spread apart. This ensures each buffer tube 8 undergoes the same relative blade depth, preload, and curve diameter. This setting mechanism is accurate because it acts on a control surface 80 of upper tool half 22a and a barrel surface 74 diameter feature on the other half 22b.

The range multiplying device 90 is a spacer or shim that may double or otherwise increase the effective cable diameter range of the tool. It provides a variable control surface 90 slideable on track 94 in and out between the barrel 70 and base control surface 80 in top half 22a of the tool by movement of control handle 92. The thickness of the variable control surface 90 is sized to make all channel settings increase a specific distance, for example 1.0 mm. This shim, along with the channel geometry ensures each buffer tube is properly constrained without causing interference for other buffer tube sizes.

The tool 20 also has sizing gaps 96 of different widths that operate as gauges to allow the end user to understand which barrel position should be used. In the field, it is not practical that the end user will know what diameter they are working with and the sizing gauge will help the end user quickly establish the tool setting.

The tool as described above provides for removing insulation in mid-span of a cable carrying a plurality of signal-transmitting conduits which utilizes an improved fiber alignment channel, fine adjustment mechanism, and range multiplying feature to maximize precision and range of the tool. The tool provides for removing insulation in mid-span of a cable carrying a plurality of signal-transmitting conduits which allows for all buffer tubes to be accurately shaved all with one tool. The tool also provides a fine adjustment barrel for accurate setting adjustment and an alignment arc which orients fibers inside buffer tube and creates accurate and repeatable presentation of fiber to blade and preload area. The tool is easily manufactured from a polymer and provides a range multiplying feature to effectively double the range of the tool. The tool provides a blade which is easily replaced and is secured by blade supports which limit the flex of the blade. The tool provides cable sizing gaps for field evaluation of tool settings.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for removing insulation in mid-span of a cable carrying a signal-transmitting conduit comprising:

a lower body section and an upper body section movable toward and away from the lower body section;

a curved mandrel disposed on the lower body section, the curved mandrel having a central peak portion and adjacent portions curving downward away from the peak portion, to present a mid-span portion of the cable insulation on a side away from the mandrel peak portion;

a blade disposed on the upper body section, the blade movable toward and away from the curved mandrel;

wherein the cable is securable in the curved mandrel in a curved position, allowing the blade to shave the cable insulation allowing access to the signal-transmitting conduit.

2. The tool of claim 1 including an adjustment barrel having a length and a central axis extending the length of the barrel and including a plurality of height adjustment surfaces each adjustment surface disposed at a different distance from the barrel axis wherein each height adjustment surface positions the blade a different distance from the mandrel.

3. The tool of claim 2 including an adjustment knob for controlling the distance between the upper body section and the lower body section when the tool is in a closed position.

4. The tool according to claim 3 wherein the adjustment knob includes a knob face and a plurality of sizing notches disposed in the knob face, each sizing notch corresponding with the diameter of different diameter cables.

5. The tool of claim 2 wherein the barrel and control surfaces are planar, and the different adjacent barrel surfaces around the barrel circumference set to increasingly greater or smaller distances from the central axis.

6. The tool of claim 2 further including a knob for rotating the barrel, the knob having indicia thereon to indicate the selected one of the barrel surfaces presented toward the control surface.

7. The tool of claim 1 including a cable channel disposed along the curved surface of the mandrel, the cable slidable along the cable channel when the cable is disposed in the cable channel and including a cable guide disposed on the upper body portion wherein the cable guide secures the cable in the cable channel when the upper body portion is in a position toward the lower body portion wherein the blade extends through the cable guide to contact the portion of the cable insulation at the mandrel peak.

8. The tool of claim 7 wherein the mandrel is a first mandrel disposed on one side of the lower body portion and the tool includes a second mandrel on the opposite side of the lower body portion than the first mandrel and the cable guide is a first cable guide disposed on the upper body portion adjacent the first mandrel and the tool includes a second cable guide adjacent the second mandrel wherein the first cable guide secures a first cable in the first cable channel when the upper body portion is in a position toward the lower body portion or the second cable guide secures a second cable having a different diameter than the first cable diameter when the upper body portion is in a position toward the lower body portion and wherein the blade is a first blade disposed on the upper body portion adjacent the first mandrel and the tool includes a second blade adjacent the second mandrel.

9. The tool of claim 8 including an adjustment barrel having a length and a central axis extending the length of the barrel and including a plurality of height adjustment surfaces each adjustment surface disposed at a different distance from the barrel axis and including a first adjustment knob on one end of the barrel corresponding with one range of cable diameters and a second adjustment knob on the opposite end of the barrel corresponding with a second range of cable diameters.

10. The tool according to claim 9 wherein each of the adjustment knobs includes a knob face and a plurality of sizing notches disposed in the knob face, each sizing notch corresponding with the diameter of different diameter cables.

11. The tool of claim 1 wherein the lower body portion includes at least one alignment member and the upper body portion includes at least one alignment opening slidingly engagable with the at least one alignment member wherein the upper body portion maintains a position parallel with the lower body portion when the upper body portion is moved toward or away from the lower body section.

12. The tool of claim 11 including a stop fastener disposed on the at least one alignment member wherein the upper body portion is limited in the distance the upper body portion is movable in a direction away from the lower body portion and including a compression spring disposed on the at least one alignment member wherein the upper body portion is biased away from the lower body portion.

13. The tool of claim 1 further including a loading member contacting the cable insulation on the side of the cable away from the mandrel, in a location adjacent to and prior to the cable insulation being shaved by the blade.

14. The tool of claim 1 further including blade supports contacting both sides of the blade over a substantial portion of the surface thereof.

15. The tool of claim 1 including a loading member contacting the cable insulation on the side of the cable away from the mandrel, in a location adjacent to and prior to the cable insulation being shaved by the blade, and blade supports contacting both sides of the blade over a substantial portion of the surface thereof, the tool housing being adjustably secured to the curved mandrel to adjust the distance therebetween.

16. The tool of claim 1 wherein the plane of the blade is at an acute angle to the longitudinal axis of the cable at the mandrel central peak portion, and the blade has a cutting edge oriented perpendicular to the cable longitudinal axis and cuts a desired circumferential width of the insulation.

17. The tool of claim 1 wherein the cable insulation on the side of the cable away from the mandrel peak portion is in tension before being contacted by the blade.

18. A tool for cutting or removing insulation from a cable carrying a plurality of signal-transmitting conduits comprising:

a housing having a first housing portion for supporting the cable and a second housing portion for securing a blade to cut or remove insulation from the cable supported by the first housing portion, the first and second housing portions being moveable toward and away from each other to position the blade a desired distance from the cable supported by the first housing portion;

a barrel rotatable about a central axis and having plurality of surfaces around its circumference, each of the barrel surfaces being located at a different distance from the central axis;

a control surface for contacting one of the barrel surfaces, wherein the control surface is disposed on one of the first or second housing portions and the barrel is rotatably secured to the other of the first or second housing portions to present a selected one of the barrel surfaces to the control surface, wherein when the first and second housing portions are moved toward each other, the selected barrel surface contacts the control surface and establishes the closest distance between the housing portions and the distance of the blade from the cable supported by the first housing portion, and wherein when the distance between the first and second housing portions is established by contact between the selected one of the barrel surfaces and the control surface, the established distance is fixed and the cable is moved relative to the housing to use the blade to cut or remove the insulation from the cable.

19. A method for shaving insulation from a cable carrying at least one signal-transmitting conduits comprising:

providing a cable having cable insulation around a plurality of signal-transmitting conduits;

providing a tool for removing insulation comprising a lower body section and an upper body section movable toward and away from the lower body section, a curved mandrel disposed on the lower body section, the curved mandrel having a central peak portion and adjacent portions curving downward away from the peak portion, to present a mid-span portion of the cable insulation on a side away from the mandrel peak portion; and a blade disposed on the upper body section, the blade movable toward and away from the curved mandrel;

ensuring the tool is in an open position;

securing the cable in the curved mandrel in a curved position;

moving the first and second housing portions toward each other, fixing the established distance between the housing portions and the distance of the blade from the cable supported by the first housing portion;

moving the cable relative to the housing and using the blade to cut or remove the insulation from the cable;

moving the first and second housing portions away from each other; and removing the cable from the curved mandrel.

20. The method of clam 19 wherein the tool includes an adjustment barrel having a length and a central axis extending the length of the barrel and including a plurality of height adjustment surfaces each adjustment surface disposed at a different distance from the barrel axis wherein each height adjustment surface positions the blade a different distance from the mandrel and the method includes rotating the barrel to present a selected barrel surface toward the control surface, and the step of moving the first and second housing portions toward each other includes moving the first and second housing portions until the selected barrel surface contacts the control surface, fixing the established distance between the housing portions and the distance of the blade from the cable supported by the first housing portion.

* * * * *